D. T. TIMBERLAKE.
TRACTION ENGINE.
APPLICATION FILED JULY 6, 1909.

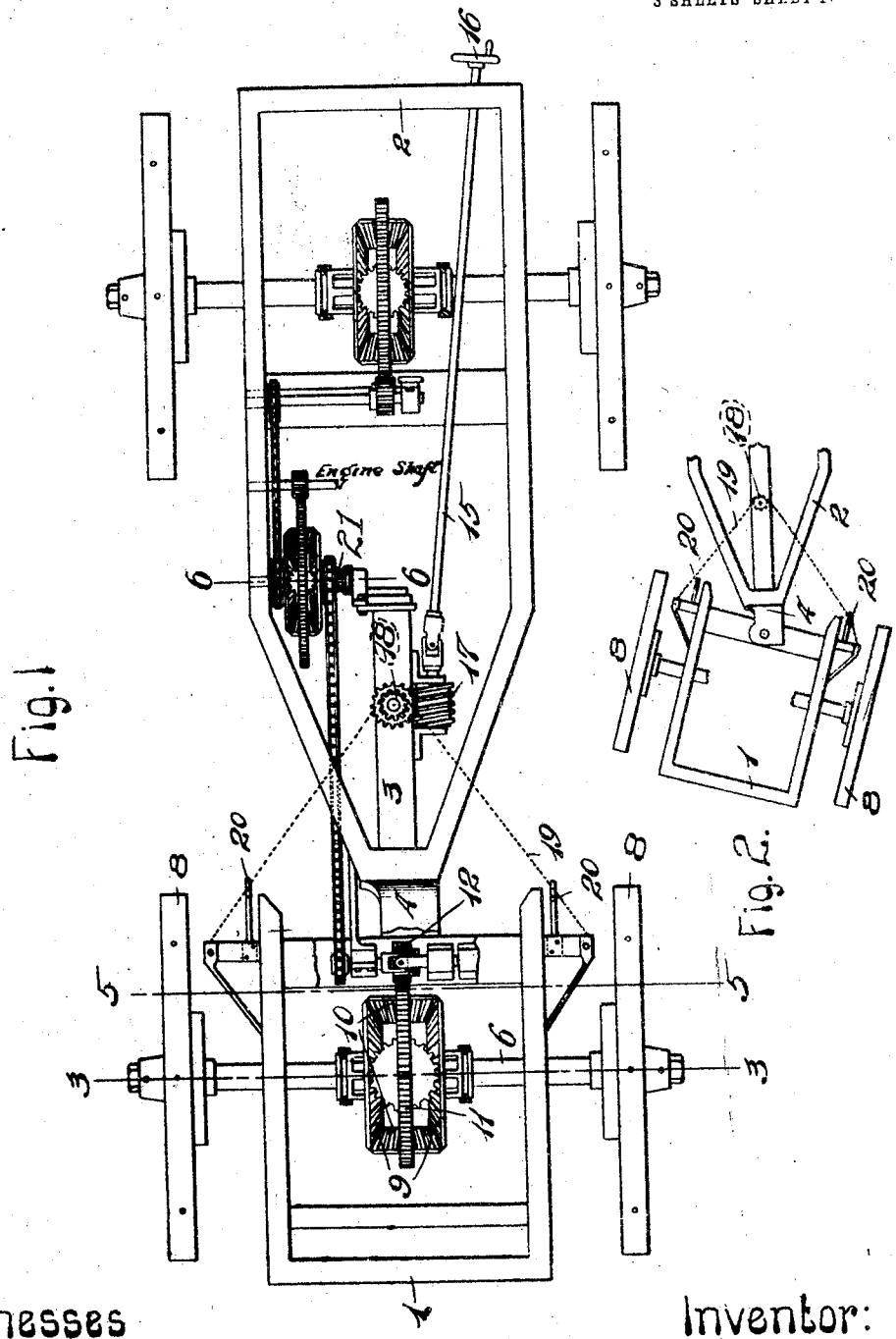

1,053,329.

Patented Feb. 18, 1913.
3 SHEETS—SHEET 2.

Witnesses
A. J. McCauley
E. W. Herington

Inventor:
Daniel T. Timberlake
by
F. R. Cornwall, Atty.

D. T. TIMBERLAKE.
TRACTION ENGINE.
APPLICATION FILED JULY 6, 1909.
1,053,329.
Patented Feb. 18, 1913.
3 SHEETS—SHEET 3.
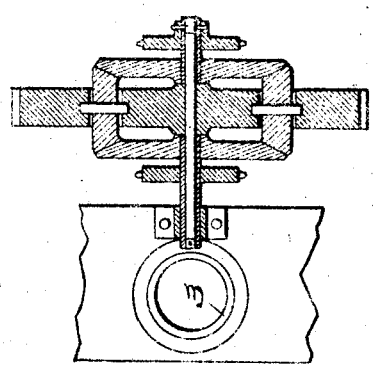
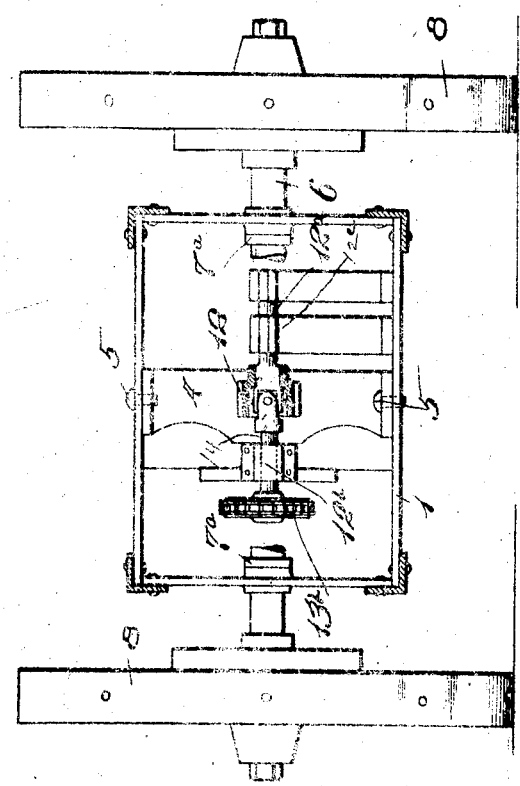
Witnesses
A. J. McCauley
E. M. Kenington
Inventor:
Daniel T. Timberlake
by
F. R. Cornwall Atty.

UNITED STATES PATENT OFFICE.

DANIEL T. TIMBERLAKE, OF BAILEYVILLE, KANSAS.

TRACTION-ENGINE.

1,053,329.

Specification of Letters Patent. Patented Feb. 18, 1913.

Application filed July 6, 1909. Serial No. 506,032.

*To all whom it may concern:*

Be it known that I, DANIEL T. TIMBERLAKE, a citizen of the United States, residing at Baileyville, Kansas, have invented a certain new and useful Improvement in Traction-Engines, of which the following is a full, clear, and exact description, such as will enable others skilled in the art to which it appertains to make and use the same, reference being had to the accompanying drawings, forming part of this specification, in which—

Figure 4:
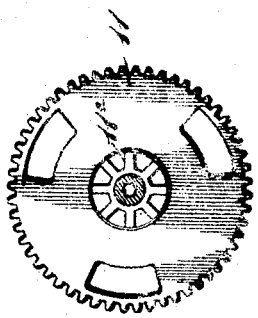
Figure 3:
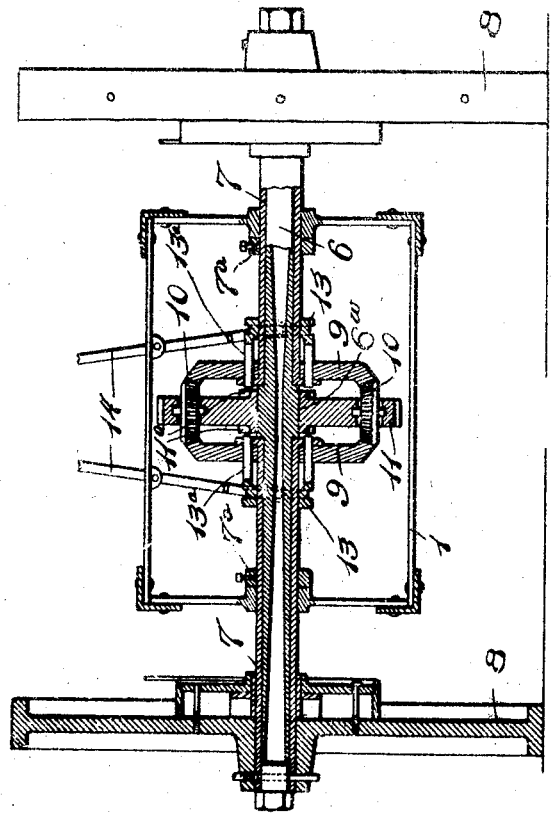

Figure 1 is a top plan view of my improved traction engine. Fig. 2 is a diagrammatic view illustrating the front truck in the position which it assumes in taking a curve. Fig. 3 is a sectional view on line 3—3, Fig. 1. Fig. 4 is a detailed view of one of the differential gear master wheels. Fig. 5 is a sectional view on line 5—5, Fig. 1. Fig. 6 is a sectional view on line 6—6, Fig. 1.

This invention relates to a new and useful improvement in traction engines and is designed particularly as an improvement on the traction engine shown and described in United States Letters Patent No. 905,481, granted to me December 1, 1908, and No. 927,085 granted to me July 6, 1909.

The traction engines of my former patents are driven by differential gears from a central source of power, so that each one of the traction wheels was separately driven. The front truck was swiveled so as to rock about a horizontally disposed pivot, and steering apparatus was applied for swinging the front truck on its king pins in taking curves.

The objects of my present invention are:

1st: To provide means whereby one or more of the traction wheels may be connected to the source of power whereby the connected wheel or wheels is positively driven from said source of power. The purpose of this is to overcome the possible objection which might arise in some uses of my improved traction engine where the differential gear would permit a differential movement of the several traction wheels. To illustrate, if one of the traction wheels should be located on ice, mud or a slippery portion of the road, such traction wheel, meeting with less resistance than its companion, would absorb all the driving motion and "spin". This "spinning" would last as long as the wheels met with differential resistance, and for such reason I prefer to provide my traction wheels with retractive teeth or spurs, which may be projected to bite into the road and avoid spinning when the character of the road warrants their use. According to my present invention, in the event that two wheels of a pair are on portions of the road having different characteristics, as, for instance, if one wheel rested upon ice and the other upon earth, it is possible by my present improvement to lock the two wheels together so as to avoid spinning of the wheel having the least resistance, to-wit, the wheel resting on ice, and by so locking the wheels together, the power of the wheel having traction ability will be exerted to move the vehicle forward until the disability of the wheel having little or no traction is removed.

2nd: To provide the front swiveling truck with a compensating device for a supporting chain or cable, whereby when the front truck is swung to take a curve, the slack on one side of the chain or cable incident to the swinging of the truck will be taken up.

3rd: To lighten the structure by forming the axles with tapered openings, whereby the axles may be rolled as a tapered, seamless tube, the fibers on the inside greatly increasing the strength of the axle.

In the drawings, 1 indicates the frame of the front truck and 2 the frame of the rear truck. 3 is a tubular reach constituting a horizontal pivotal axis between the front and rear trucks. The forward end of this reach is provided with a yoke 4 in the end of which are the king pins 5 constituting vertical pivotal axis for the front truck.

6 is the hollow axle formed with a tapered opening and preferably rolled as a seamless tube, so that its inner surface will have a strengthening skin or fiber. This axle is provided with an enlarged central body portion 6$^a$ against which sleeves 7 abut. Each wheel is provided with means to hold the axle in position, as described in my aforesaid patent.

7 are sleeves mounted on the axle, and whose outer ends carry the traction wheels 8. These sleeves pass through bearings in the side frames of the truck, and are provided with shoulders or collars $7^a$ which prevent endwise motion of said sleeves. The inner ends of the sleeves carry miter-gears 9 which mesh with planetary pinions 10 mounted in, and carried by a master-gear 11. This master-gear is loosely mounted on the axle 6 between the two facing miter-gears 9 and connected to the wheels of a pair.

12 is a pinion meshing with the master-gear 11 for imparting motion thereto.

When the pinion 12 is driven, it is obvious that the wheels 8, resting upon the ground, will be driven at a uniform speed, as when going in a straight line. Should the engine move in a circular path, the wheels on the outer side of the circle would have to travel the greater distance and this is accomplished through the differential gearing just described. Should one of the wheels of a pair rest upon ice or other slippery support, as heretofore referred to, such wheel, being free to rotate, will be rotated or will "spin", absorbing all the power, while its companion wheel, having traction ability, will remain stationary. The differential gearing permits the power to exhaust itself through the path of least resistance.

13 represents a clutch member mounted on the sleeve 7 and provided with clutch fingers $13^a$ which pass through suitable guide openings in the gear 9 to coöperate with recesses or projections $11^a$ carried by the master-gear 11. The hub of the clutch member 13 is provided with a circumferential groove with which coöperates a bifurcated end of an operating lever 14. When the clutch is operated so as to lock the master-gear 11 to one of the gears 9, it is obvious that both traction wheels 8 are locked together, because the planetary pinions 10 cannot rotate and hence the opposite companion gear 9 will likewise be locked to the master-gear. I prefer, however, to provide a clutch for each wheel 8 and avoid unnecessarily straining the parts, as might be done were a single clutch used. When one or both clutches is operated and the two wheels 8 are locked together, it is obvious that power is applied directly from the pinion 12 to the master-gear 11, which is locked to the wheels 8 and hence both traction wheels are positively driven in unison.

Supporting apparatus in the form of a shaft 15 carrying a handwheel 16 and a worm 17 operates a sprocket 18, over which runs a chain or cable 19, the ends of said chain or cable being connected to the rear corners of the front truck. When the engine is traveling in a straight line there is an equal amount of chain or cable on each side of the sprocket 18, and hence an isometric angle is formed. When the front truck is turned, as shown in Fig. 2, the sprocket 18, traveling in an arc of a circle described from the king pin 5, will approach one corner of the front truck a greater distance, relatively, than it leaves the other corner, and, consequently, the asymmetric formation of the angle produces a slack in that part of the chain constituting one of the long legs of the angle. To take up this slack, I mount forked arms 20 on the front truck which arms, as shown in Fig. 2, when the front truck is swung, extending some distance behind the pivotal axis 5, will swing an outward arc of the circle, causing a bend or jog to occur in the long leg of the chain which becomes more acute as the angularity of the break increases. In this manner, the chain is kept taut at all times, it being unnecessary for the operator to reverse the movement of the steering apparatus to take up lost motion which would occur were it not for the presence of these take-up arms 20.

The pinion 12, heretofore referred to as the driving pinion, is mounted upon a shaft $12^a$, arranged in bearings $12^c$ extending from the front truck frame (see Fig. 5). This pinion is made hollow and is connected by a universal joint to a shaft 14 mounted in a bearing $12^b$ extending from the rear truck. A sprocket wheel $13^b$ is arranged on the shaft 14 and is connected by a differential driving gear with the engine shaft. The differential gearing for driving the front and rear trucks is also preferably provided with locking clutches 21, so that both front and back master-gear wheels can be locked to the engine shaft for the purpose above described.

I am aware that minor changes in the construction and arrangement of the several parts of my device can be made and substituted without in the least departing from the nature and principle of my invention.

Having thus described my invention, what I claim is:

1. In a traction vehicle, the combination of two trucks connected to each other by a swivel joint, a power transmission shaft mounted on one truck, a second shaft mounted on the other one of the trucks and connected to the first shaft by means of a universal joint, a gear mounted on said second shaft surrounding the universal joint, and a driving mechanism comprising a gear meshing with the first mentioned gear.

2. In a traction vehicle, the combination with front and rear trucks connected to each other by a swivel joint, a shaft on the rear truck, a shaft on the front truck which shafts are connected by a universal joint, the axis of which coincides with the axis of the swivel between the trucks, means carried by the rear truck for driving the shaft thereon, a pinion fixed on the shaft carried by the front truck which pinion incloses the universal joint between the shafts and a driving connection from said pinion to the axle of the front truck.

In testimony whereof I hereunto affix my signature in the presence of two witnesses, this 2nd day of July 1909.

DANIEL T. TIMBERLAKE.

Witnesses.
F. R. CORNWALL,
LENORE CLARK.